(12) United States Patent
Hong (10) Patent No.: US 9,093,671 B2
(45) Date of Patent: Jul. 28, 2015

(54) ELECTRODE ASSEMBLY AND SECONDARY BATTERY USING THE SAME

(75) Inventor: Su-Bong Hong, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 198 days.

(21) Appl. No.: 13/417,995

(22) Filed: Mar. 12, 2012

(65) Prior Publication Data

US 2012/0258352 A1 Oct. 11, 2012

(30) Foreign Application Priority Data

Apr. 5, 2011 (KR) .................. 10-2011-0031276

(51) Int. Cl.
*H01M 2/00* (2006.01)
*H01M 2/02* (2006.01)
*H01M 10/04* (2006.01)

(52) U.S. Cl.
CPC .......... *H01M 2/0217* (2013.01); *H01M 2/0287* (2013.01); *H01M 10/0436* (2013.01)

(58) Field of Classification Search
None
See application file for complete search history.

(56) References Cited

U.S. PATENT DOCUMENTS

| | | | | |
|---|---|---|---|---|
| 5,486,431 A * | 1/1996 | Tuttle et al. | ............. | 429/66 |
| 6,841,297 B2 * | 1/2005 | Kitoh et al. | ............. | 429/176 |
| 7,108,941 B2 * | 9/2006 | Hayashi et al. | ............. | 429/162 |
| 7,851,078 B2 * | 12/2010 | Uh | ............. | 429/56 |
| 2002/0122975 A1 * | 9/2002 | Spillman et al. | ............. | 429/128 |
| 2004/0038125 A1 * | 2/2004 | Kim et al. | ............. | 429/162 |
| 2004/0043288 A1 * | 3/2004 | Nishijima et al. | ............. | 429/162 |
| 2004/0048151 A1 * | 3/2004 | Hayashi et al. | ............. | 429/162 |
| 2007/0196733 A1 | 8/2007 | Lee | | |
| 2008/0254348 A1 | 10/2008 | Hatta et al. | | |
| 2009/0197160 A1 * | 8/2009 | Fujiwara et al. | ............. | 429/146 |
| 2009/0311592 A1 | 12/2009 | You et al. | | |
| 2010/0047685 A1 * | 2/2010 | Lee et al. | ............. | 429/176 |
| 2011/0033735 A1 | 2/2011 | Kinoshita et al. | | |

FOREIGN PATENT DOCUMENTS

| | | |
|---|---|---|
| JP | 2000-223086 | 8/2000 |
| KR | 20050015006 A | 2/2005 |
| KR | 20060030599 A | 4/2006 |
| KR | 0601547 B1 | 7/2006 |
| KR | 20070047651 A | 5/2007 |
| KR | 2008-0092871 A | 10/2008 |

OTHER PUBLICATIONS

English translation of Korean Office Action dated Aug. 11, 2012 of the Korean Patent Application No. 10-2011-0031276.
English translation of Korean Notice of Allowance dated Feb. 12, 2013 of the Korean Patent Application No. 10-2011-0031276.

* cited by examiner

*Primary Examiner* — Patrick Ryan
*Assistant Examiner* — Jose Colucci Rios
(74) *Attorney, Agent, or Firm* — Robert E. Bushnell, Esq.

(57) ABSTRACT

A battery case for a secondary battery and a secondary battery using the same. The secondary battery includes an electrode assembly and the battery case. The electrode assembly is composed of a first electrode plate, a second electrode plate and a separator interposed therebetween. The battery case is provided with an accommodating portion that accommodates the electrode assembly. In the secondary battery, the depth of the accommodating portion is approximately 70% to approximately 80% of the thickness of the electrode assembly.

15 Claims, 7 Drawing Sheets

ELECTRODE ASSEMBLY AND SECONDARY BATTERY USING THE SAME

CLAIM OF PRIORITY

This application makes reference to, incorporates the same herein, and claims all benefits accruing under 35 U.S.C. §119 from an application earlier filed in the Korean Intellectual Property Office on Apr. 5, 2011 and there duly assigned Serial No. 10-2011-0031276.

BACKGROUND OF THE INVENTION

1. Field of the Invention

An aspect of the present invention relates to a secondary battery, and more particularly, to a case for a secondary battery and a secondary battery having the same, which can improve battery performance.

2. Description of the Related Art

Recently, secondary batteries have been variously used as power sources of portable electronic devices.

As portable electronic devices are used in various fields, demand on high-capacity secondary batteries is rapidly increased. Accordingly, various studies have been conducted to improve stability of secondary batteries.

SUMMARY OF THE INVENTION

Embodiments provide an improved secondary battery.

Embodiments also provide a secondary battery having enhanced adhesion between positive and negative electrode plates.

Embodiments also provide a secondary battery having enhanced C-rate and high-temperature characteristics, and the like.

According to an aspect of the present invention, a secondary battery may be constructed with an electrode assembly composed of a first electrode plate, a second electrode plate and a separator interposed therebetween, and a battery case provided with an accommodating portion that accommodates the insertion and continued internal residency of the electrode assembly. A depth of the accommodating portion may be approximately 70% to approximately 80% of a thickness of the electrode assembly.

The battery case may include a first case portion and a second case portion, and the accommodating portion is provided to at least one of the first and second case portions.

The first case portion may be a main body to which the accommodating portion is provided, and a second case portion may be a cover that covers the main body of the battery case.

The first and second case portions may be formed of different materials from each other.

Each one of the first and second case portions may be formed from a sheet, and the thickness of the sheet for forming the second case portion may be larger than that of the first case portion.

Each of the first and second case portions may include an internal resin layer, a metal layer and an external resin layer, and the thickness of the metal layer of the second case portion may be approximately 150% to approximately 200% of the thickness of the metal layer of the first case portion. The metal layer may include aluminum.

A first accommodating portion and a second accommodating portion may be provided to both the first and second case portions, respectively, and the sum of the depths of the first and second accommodating portions may be approximately 70% to approximately 80% of the thickness of the electrode assembly.

The depth of the first accommodating portion may be identical to that of the second accommodating portion.

The accommodating portion may be provided to correspond to the shape of the electrode assembly.

The accommodating portion may be provided by deep drawing.

The battery case may be a pouch.

According to another aspect of the present invention, a case may be provided for a secondary battery, which accommodates an electrode assembly composed of one or more electrode plates and a separate interposed between the electrode plates. The case may be a pouch including a first case portion and a second case portion, an accommodating portion is provided to at least one of the first and second case portions, and the depth of the accommodating portion may be approximately 70% to approximately 80% of the thickness of the electrode assembly.

The first and second case portions may be formed of different materials from each other, and the thickness of the second case portion may be formed thicker than that of the first case portion.

As described above, according to embodiments of the present invention, it is possible to provide a secondary battery and a case for the secondary battery, which can prevent positive and negative electrode plates from being spaced apart from each other by the contraction and expansion of an electrode assembly as the charge/discharge of the secondary battery is performed, and enhance the adhesion between the electrode plates.

Also, it is possible to provide a secondary battery and a case for the secondary battery, which can simplify a manufacturing process of the secondary battery and improve characteristics of the secondary battery.

BRIEF DESCRIPTION OF THE DRAWINGS

A more complete appreciation of the invention, and many of the attendant advantages thereof, will be readily apparent as the same becomes better understood by the reference to the following detailed description when considered in conjunction with the accompanying drawings in which like reference symbols indicate the same or similar components, wherein.

DETAILED DESCRIPTION OF THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Figure 1A:
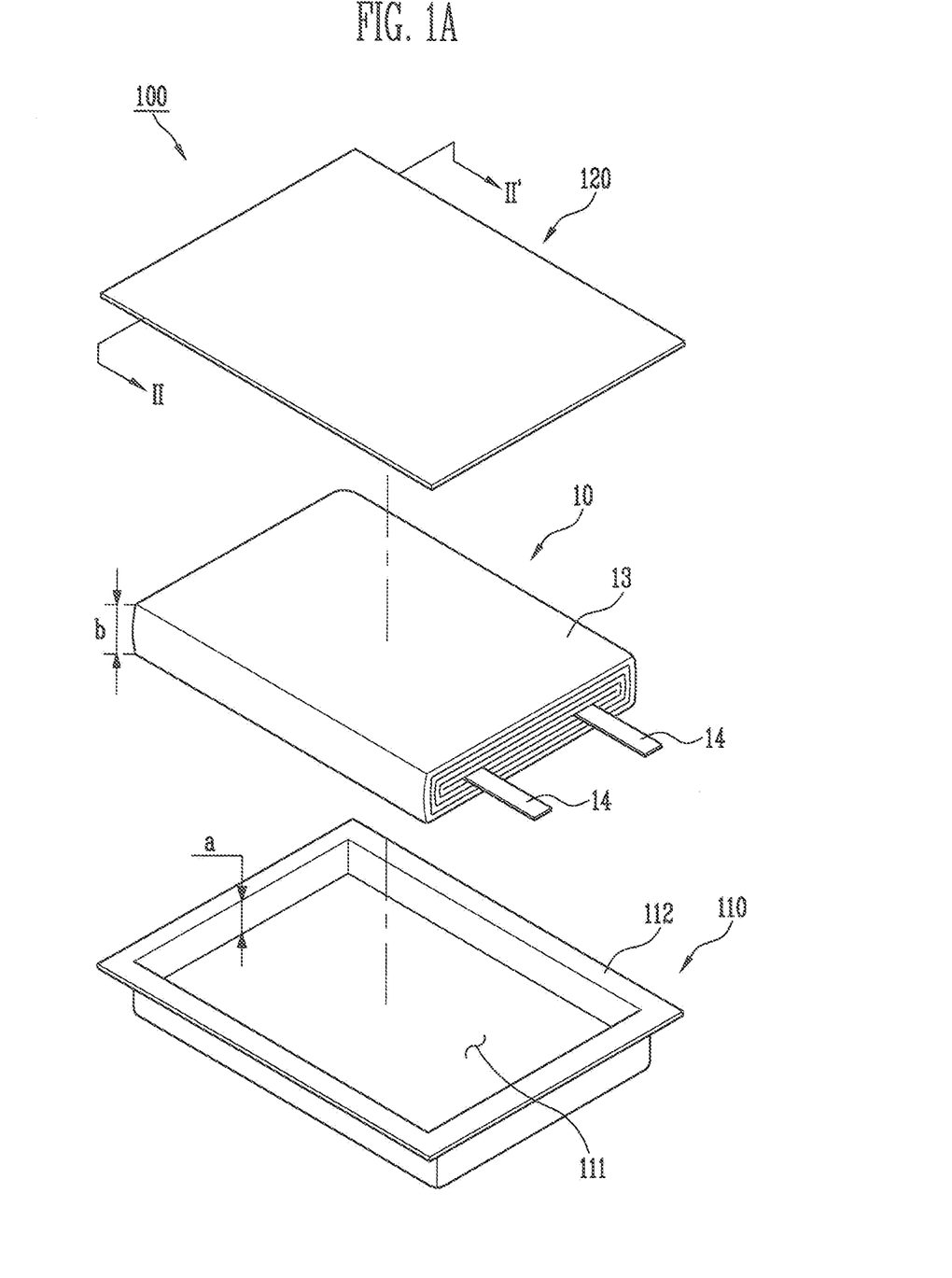
FIG. 1A is an exploded oblique view of a secondary battery constructed as an embodiment according to the principles of the present invention.
Figure 1B:
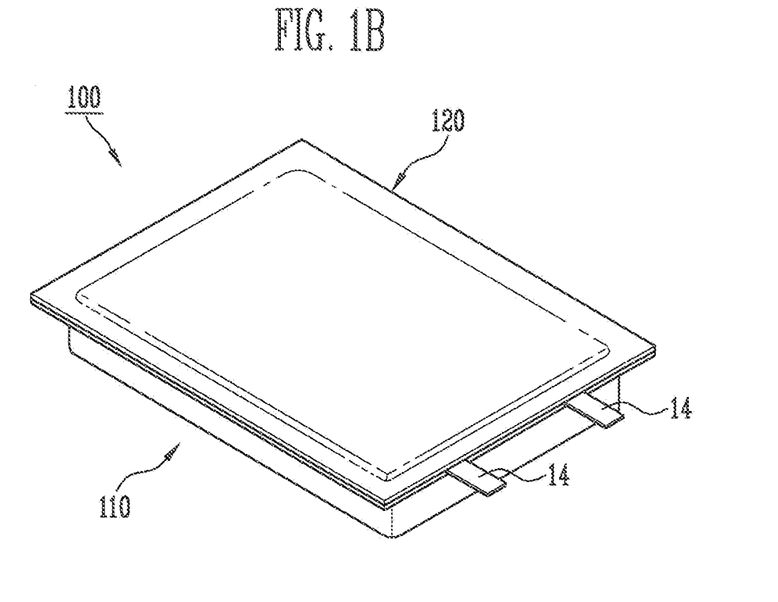
FIG. 1B is an oblique view of the secondary battery constructed as the embodiment according to the principles of the present invention.

FIG. 1A is an exploded oblique view of a secondary battery constructed as an embodiment according to the principles of the present invention. FIG. 1B is an oblique view of the secondary battery constructed as the embodiment according to the principles of the present invention.

Secondary battery 100 constructed as this embodiment according to the principles of the present invention includes an electrode assembly 10 composed of a first electrode plate, a second electrode plate and a separator 13 interposed therebetween, and a battery case 110 and 120 provided with an accommodating portion 111 that accommodates the insertion and continued internal residency of electrode assembly 10. Depth 'a' of accommodating portion 111 is approximately 70% to approximately 80% of thickness 'b' of electrode assembly 10.

Referring to FIGS. 1A and 1B, secondary battery 100 constructed as this embodiment of the present invention may include battery case 110 and 120, electrode assembly 10 accommodated in battery case 110 and 120, and an electrolyte (not shown).

Electrode assembly 10 may include a first electrode plate, a second electrode plate, and a separator interposed therebetween. When assuming that the first electrode plate is a positive electrode plate and the second electrode plate is a negative electrode plate, electrochemical energy can be generated by moving ions or electrons between the positive and negative electrode plates.

The positive electrode plate may be formed by coating a positive electrode active material on a single surface or both surfaces of a positive electrode collector. The positive electrode collector may be generally formed of a material having high conductivity, and is not particularly limited as long as the material does not cause a chemical change. The positive electrode active material may include a layered compound containing lithium.

The negative electrode plate may be formed by coating a negative electrode active material on a single surface or both surfaces of a negative electrode collector. The negative electrode collector may be formed of a conductive metal, and the negative electrode active material may include graphite and the like.

In a case where the electrode plates have polarities opposite to each other, separator 13 may be interposed between the electrode plates so as to prevent the electrode plates from being short-circuited by coming in direct contact with each other. For example, separator 13 may be formed of a polymer material. An insulative thin film having high ion and mechanical strength may be used as separator 13.

The electrolyte (not shown) accommodated in battery case 110 and 120 may include a lithium salt that serves as a supply source of lithium ions, and a non-aqueous organic solvent that acts as a medium for moving ions participating in an electrochemical reaction. The positive and negative electrode plates that constitute electrode assembly 10 may react with the electrolyte so as to generate electrochemical energy. The electrochemical energy may be transferred to the exterior of the secondary battery through electrode leads 14. The electrode assembly may be manufactured using various methods such as a method of winding or stacking the positive electrode plate, the negative electrode plate and the separator.

Battery case 110 and 120 may include a first case portion 110 and a second case portion 120, and an accommodating portion 111 may be provided to at least one of first and second case portions 110 and 120. In this instance, first case portion 110 may be a main body having accommodating portion 111 provided in the battery case, and second case portion 120 may be a cover that covers the main body of the battery case. For example, a pouch may be used as battery case 110 and 120, but the present invention is not limited thereto.

A sealing portion 112 may be provided to an edge of main body 110. The secondary battery according to this embodiment may be manufactured by accommodating electrode assembly 10 and the electrolyte (not shown) in accommodating portion 111 of main body 110, and then thermally bonding sealing portion 112 in the state that main body 110 and cover 120 are adhered closely to each other.

Electrode leads 14 formed of an electrical conductor may be provided to the positive and negative electrode plates of electrode assembly 10, respectively. Electrode leads 14 are provided to be protruded to the outside of the battery case through sealing portion 112 of main body 110, so as to electrically connect secondary battery 100 to the exterior of secondary battery 100.

Figure 2:
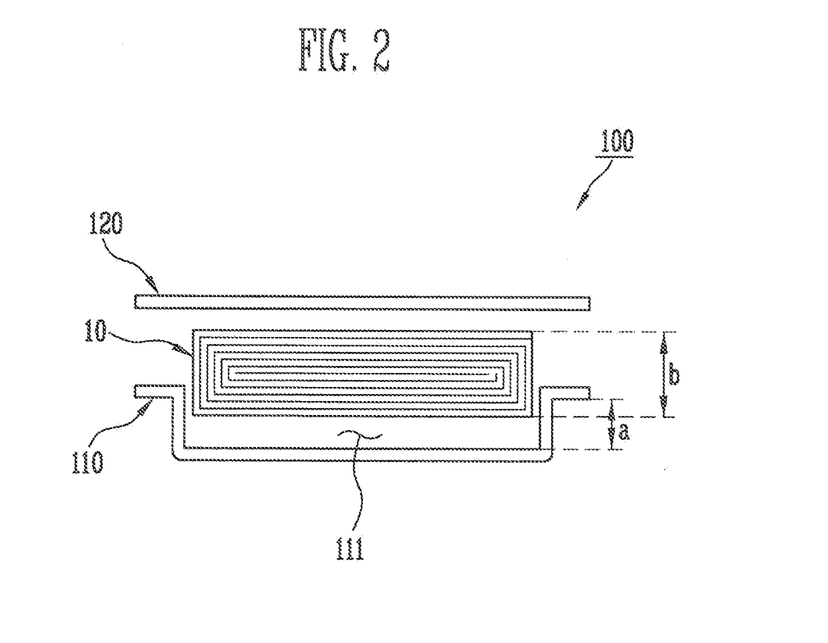
FIG. 2 is a cross-sectional view of the secondary battery constructed as the embodiment taken along sectional line II-II' of FIG. 1A.

FIG. 2 is a cross-sectional view of the secondary battery constructed as the embodiment taken along sectional line II-II' of FIG. 1A.

Referring to FIG. 2, accommodating portion 111 may be provided to correspond to the shape of electrode assembly 10. Accommodating portion 111 may be provided by deep drawing for manufacturing a hollow container from a flat plate without a joint. Deep drawing is a sheet metal forming process in which a sheet metal blank is radially drawn into a forming die by the mechanical action of a punch. As the charge or discharge of secondary battery 100 is performed, electrode assembly 10 may be contracted and expanded, and accordingly, the adhesion between the positive and negative electrode plates is decreased. Therefore, the mobility of ions or electrons between the electrode plates is lowered, and the lowered mobility may have bad influence on characteristics of secondary battery 100.

In secondary battery 100 constructed as this embodiment, the depth of accommodating portion 111 provided to battery case 110 and 120 is formed smaller than the thickness of electrode assembly 10 accommodated in accommodating portion 111. When main body 110 having electrode assembly 10 accommodated therein is covered by cover 120, main body 110 and cover 120 may be sealed so that main body 110 and a wide surface of cover 120 press inward electrode assembly 10 that comes in contact therewith. Thus, electrode assembly 10 can be stably fixed in the interior of battery case 110 and 120, and the adhesion between the electrode plates can be enhanced by the contraction and expansion of electrode assembly 10.

In this instance, depth 'a' of accommodating portion 111 may be approximately 70% to approximately 80% of thickness 'b' of electrode assembly 10. In a case where depth 'a' of accommodating portion 111 is less than 70% of thickness 'b' of electrode assembly 10, the space for accommodating electrode assembly 10 is not sufficient, and therefore, a failure such as separation of electrode assembly 10 may be caused in the process of manufacturing secondary battery 100. Specifically, when main body 110 and cover 120 are thermally bonded to each other, electrode assembly 10 may be moved. Further, the adhesion between main body 110 and cover 120 is lowered, and therefore, the electrolyte may be flowed out from the battery case, and the like. Furthermore, the space of accommodating portion 111 provided in the interior of main body 110 is deficient, and therefore, a failure may be caused in the injection process of the electrolyte. In a case where the amount of the electrolyte injected into the battery case is less than a predetermined value, this may have bad influence on characteristics of the lifetime of the secondary battery, and the like.

Thus, depth 'a' of accommodating portion 111 is preferably more than approximately 70% of thickness 'b' of electrode assembly 10. Particularly, depth 'a' of accommodating portion 111 is less than approximately 80% of thickness 'b' of electrode assembly 10. Specifically, in a case where depth 'a' of accommodating portion 111 exceeds approximately 80% of thickness 'b' of electrode assembly 10, the C-rate discharge characteristics of secondary battery 100 or the enhancement of characteristics after secondary battery 100 is left at a high temperature may be insignificant.

Figure 3:
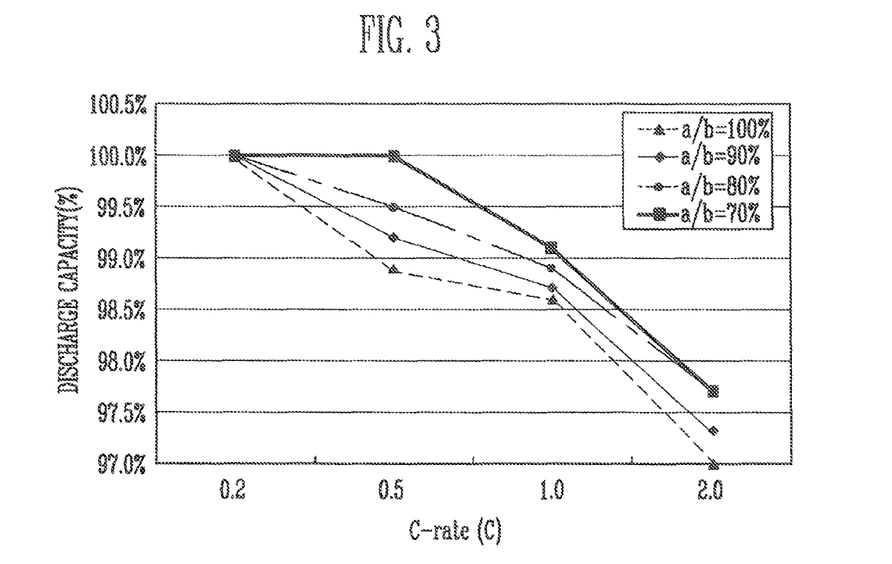
FIG. 3 is a graph showing C-rate discharge characteristics of secondary batteries fabricated with different a/b ratios.
Figure 4:
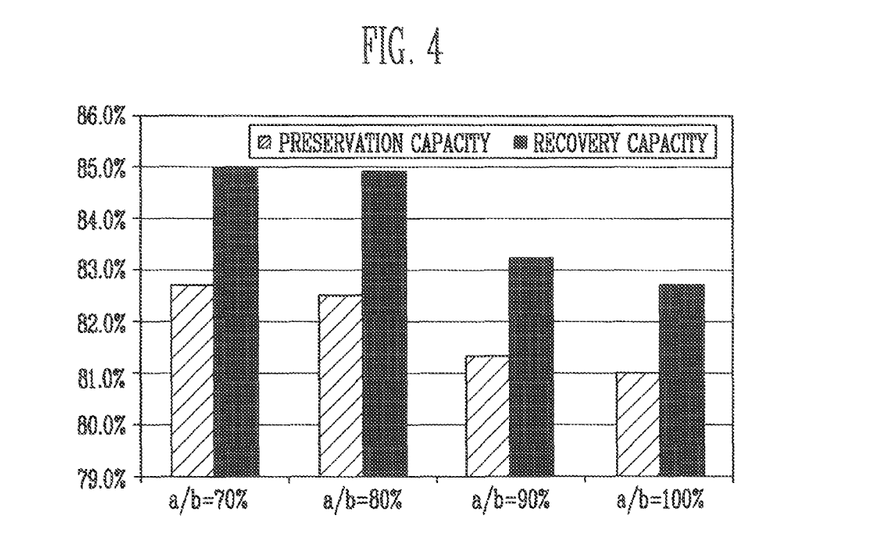
FIG. 4 is a graph showing preservation and recovery capacities of secondary batteries having different a/b ratios after the secondary batteries are left at a high temperature.

FIG. 3 is a graph showing discharge capacities verses C-rate of secondary batteries fabricated with different a/b ratios. FIG. 4 is a graph showing preservation and recovery capacities of the secondary batteries fabricated with different a/b ratios after the secondary batteries are left at a high temperature. The charge and discharge current of a battery is measured in C-rate which represents the amount of charge/discharge current in relation to a battery capacity. That is, in the case that a battery is charged at a C-rate of 1 C, the battery is fully charged after one hour, and in the case that the battery is discharged at a C-rate of 1 C, the battery is fully discharged after one hour. The C-rate determines a rate of charge/discharge to fully charge or discharge the battery in one hour.

FIGS. 3 and 4 are graphs showing characteristics of a set of secondary batteries, obtained by changing the ratio between thickness 'b' of the respective electrode assembly and depth 'a' of the respective accommodating portion. The graphs show results identified by using secondary batteries composed of electrode assemblies manufactured under the same condition, charging and discharging under the same condition, and changing only the a/b ratio. FIG. 3 is a graph obtained by identifying C-rate characteristics of the secondary batteries fabricated with different a/b ratios. FIG. 4 is a graph obtained by identifying preservation and recovery capacities of the secondary batteries fabricated with different a/b ratios after the secondary battery was left at 60° C. for 10 days.

Referring to FIG. 3, it can be seen that the discharge capacities of the secondary batteries at 0.2 C-rate were almost similar regardless of the a/b ratios, but the discharge capacities of the secondary batteries at 0.5 C-rate, 1.0 C-rate or 2.0 C-rate were different depending on the a/b ratios. When considering that as the C-rate increases in discharge of the secondary battery, conditions become severe, it can be seen that C-rate characteristics according to the a/b are 100%>90%>80%>70%. When considering that the main discharge condition of the secondary battery is generally 0.5 C-rate or 1.0 C-rate, the C-rate characteristic is superior in the a/b of 70 to 80%.

FIG. 4 shows a result obtained by fully charging the secondary batteries having different "a/b" ratios and then leaving the secondary batteries at 60° C. for 10 days. The preservation capacity is a value for identifying a capacity self-discharged while the secondary battery is left at a high temperature, and the recovery capacity is a discharge capacity value obtained after the secondary battery is again charged at a normal temperature. It can be seen that as the preservation capacity and the discharge capacity increase, the secondary battery is not easily deteriorated.

When examining the preservation capacity and the discharge capacity, it can be seen that the preservation capacities and the discharge capacities according to the a/b ratio are 70%>80%>90%>100%. More specifically, similar tendencies are shown in the secondary batteries having a/b ratios of 70% and 80%, and similar tendencies are shown in the secondary batteries having a/b ratios of 90% and 100%. On the other hand, large differences exist between 70% and 80% and between 80% and 100%, respectively. Thus, in a case where the secondary battery is left at a high temperature, it can also be seen that the preservation capacities and the discharge capacities according to the a/b ratio are superior in 70 to 80%.

Synthetically, in the secondary battery constructed as this embodiment, depth 'a' of the accommodating portion is preferably 70 to 80% of thickness 'b' of the electrode assembly in terms of the productivity and performance of the secondary battery.

In the following embodiments, components except the following components are similar to those described in FIGS. 1 to 4, and therefore, their detailed descriptions will be omitted.

Figure 5:
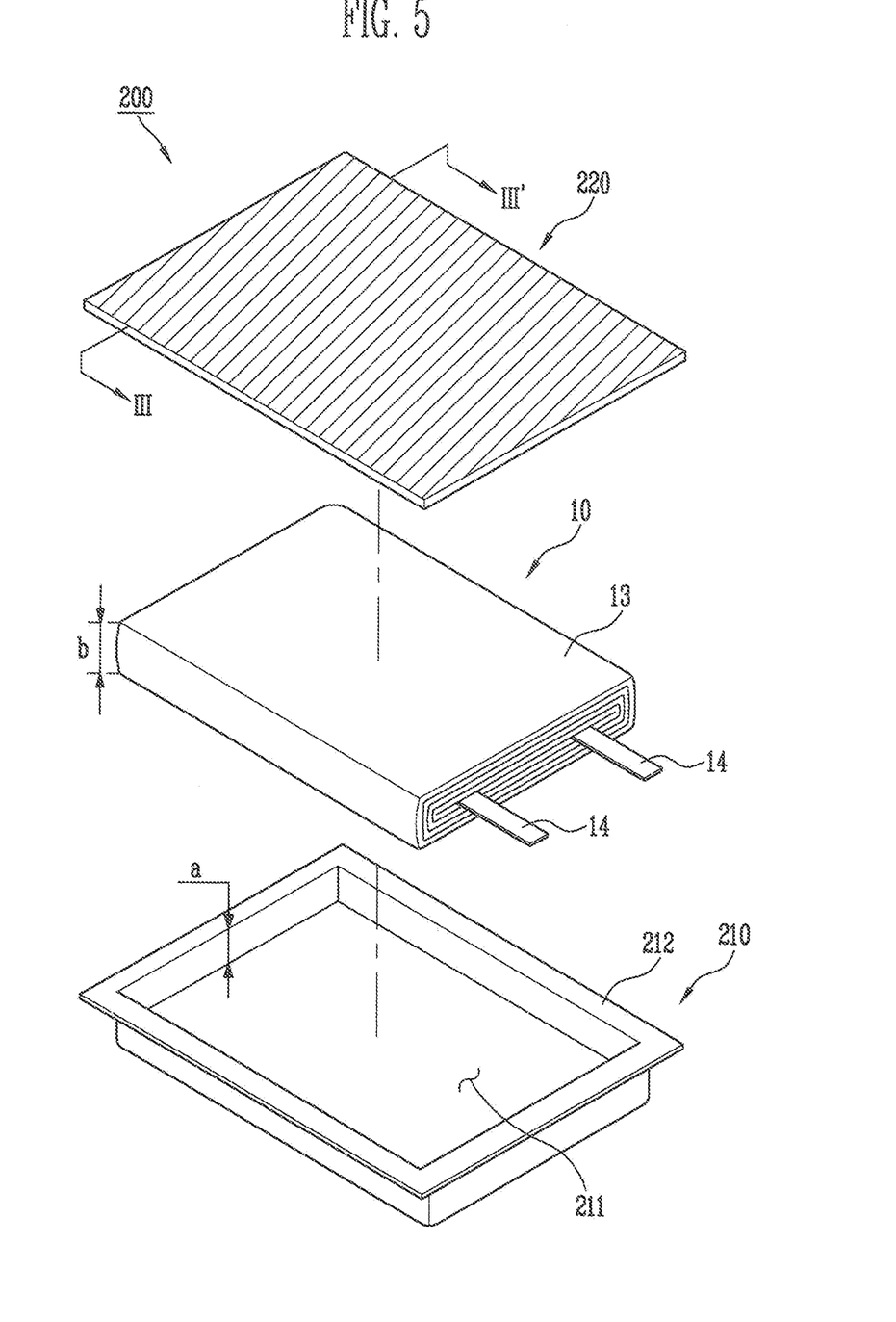
FIG. 5 is an exploded oblique view of a secondary battery constructed as another embodiment according to the principles of the present invention.
Figure 6A:
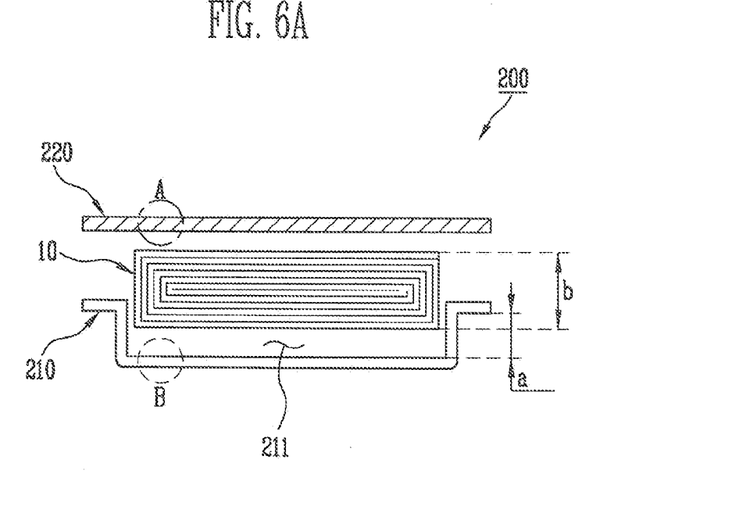
FIG. 6A is a cross-sectional view of the secondary battery constructed as the embodiment taken along sectional line III-III' of FIG. 5.
Figure 6B:
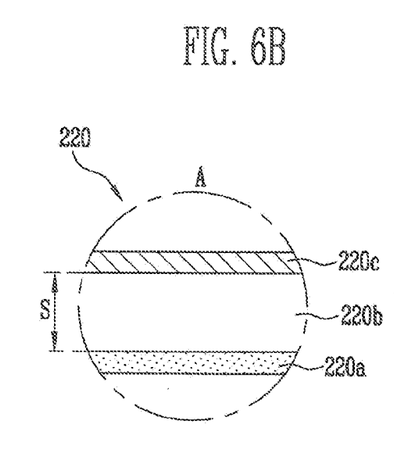
FIG. 6B is an enlarged view of portion A of FIG. 6A.
Figure 6C:
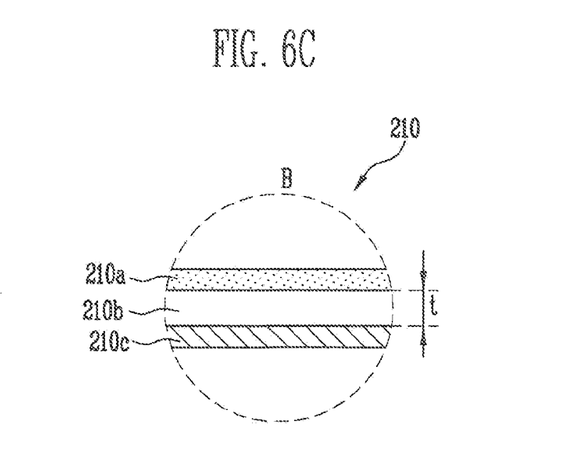
FIG. 6C is an enlarged view of portion B of FIG. 6A.

FIGS. 5 to 6C are views illustrating another embodiment of the present invention.

FIG. 5 is an exploded oblique view of a secondary battery constructed as another embodiment according to the principles of the present invention. FIG. 6A is a cross-sectional view of the secondary battery constructed as the embodiment taken along sectional line III-III' of FIG. 5. FIG. 6B is an enlarged view of portion A of FIG. 6A. FIG. 6C is an enlarged view of portion B of FIG. 6A.

Referring to FIG. 5, secondary battery 200 according to this embodiment includes an electrode assembly 10 composed of a positive electrode plate, a second electrode plate and a separator 13 interposed therebetween, and a battery case 210 and 220 provided with an accommodating portion 211 that accommodates electrode assembly 10. Depth 'a' of accommodating portion 211 may be approximately 70% to approximately 80% of thickness 'b' of electrode assembly 10.

Battery case 210 and 220 may include a first case portion 210 that is a main body and a second case portion 220 that is a cover for covering the main body. In this instance, cover 220 and main body 210 may be formed of different materials from each other, or cover 220 may be formed stronger than main body 210. A sealing portion 212 may be provided at an edge of main body 210. Main body 210 and cover 220 are thermally bonded through sealing portion 212, so that electrode assembly can be isolated from the outside thereof.

Referring to FIG. 6A, the thickness of cover 220 may be formed thicker than that of main body 210. That is, each one of cover 220 and main body 210 is fabricated from a sheet, and the thickness of the sheet for cover 220 is larger than the thickness of the sheet for main body 210. Generally, in a case where a pouch is used as battery case 210 and 220, accommodating portion 211 may be formed to provide a space for accommodating electrode assembly 10 and an electrolyte (not shown). In this case, accommodating portion 211 may be formed using deep drawing. In battery case 210 and 220, it is difficult to form main body 220 to have a predetermined thickness or thicker due to the process limitation of the deep drawing. On the other hand, the thickness of cover 220 that covers main body 210 may be adjusted separately from main body 210. Thus, unlike main body 210, cover 220 can be formed without limitation of its thickness. For example, cover 220 can be formed of a material thicker than that of main body 210.

In this embodiment, battery case 210 and 220 may be formed of a plurality of layers including an internal resin layer 210a and 220a, a metal layer 210b and 210b and an external resin layer 210c and 220c. That is, battery case 210 and 220 may be fabricated from a multi-layered, laminated sheet. Internal resin layer 210a and 220a is a portion that directly faces electrode assembly 10, and external resin layer 210c and 220c is a portion that comes in direct contact with an outside of the pouch. In order to prevent a short circuit of the secondary battery, or the like, the internal and external resin layers may be formed using a polymer that is an electrical non-conductor. On the other hand, metal layer 210b and 220b is provided between the internal and external resin layers, so as to improve the mechanical strength of the pouch. For example, the metal layer may include aluminum and the like.

Generally, the thicknesses of the main body and cover that constitute the battery case are formed identical to each other, and the thickness of the metal layer that constitutes the main body and cover is also formed identical to those of the main body and the cover. Since molding such as deep drawing is performed on the main body, the strength of the battery case is necessarily manufactured to be a predetermined value or less in consideration of moldability. Therefore, the thickness of the metal layer that has main influence on the strength of the main body and cover is necessarily limited to a predetermined value or less, and the strength of the battery case has a low level without distinction of the main body and the cover.

In battery case 210 and 220 according to this embodiment, the metal layers 210b and 220b respectively provided to main body 210 and cover 220 may be separately controlled. That is, metal layer 210b provided with main body 210 may be provided in consideration of the moldability of the main body, and metal layer 220b provided with cover 220 may be provided to have a sufficient strength because it does not require separate molding.

In this embodiment, the thickness of metal layer 220b of cover 220 may be further increased than that of the meal layer provided to a general cover, and thus the mechanical strength of metal layer 220b of cover 220 can be increased. As the thickness of metal layer 220b of cover 220 is increased, the strength of the cover can be increased in proportion to the increase in thickness. For example, in a case where the thickness of the metal layer of the cover is increased twice, the strength of the cover can be increased about 2.5 times.

Specifically, referring to FIGS. 6B and 6C, in secondary battery 200 according to this embodiment, the mechanical strength of cover 220 can be increased by changing thickness 's' of metal layer 220b of cover 220. In this instance, thickness 's' of metal layer 220b of cover 220 may be approximately 150% to approximately 200% of thickness 't' of metal layer 210b of main body 210. In a case where thickness 's' of metal layer 220b of cover 220 is less than 150% of thickness T of metal layer 210b of main body 210, metal layer 220b of cover 220 is not sufficiently strong to provide a predetermined mechanical strength to cover 220, and hence its effect is slight. In a case where thickness 's' of metal layer 220b of cover 220 is over 200% of thickness T of metal layer 210b of main body 210, the elastic deformation force of metal layer 220b of cover 220 may be decreased, and the thickness of cover 220 may be increased. That is, in a case where thickness 's' of metal layer 220b of cover 220 is over 200% of the thickness T of metal layer 210b of main body 210, the elastic deformation force of cover 220 is decreased to a certain level or lower, and hence it is impossible for cover 220 to provide a sufficient adhesion to main body 210. Therefore, it is difficult to assembly secondary battery 200. Further, the weight and volume of secondary battery 200 are increased by the increased thickness 's' of metal layer 220b of cover 220, and the thermal bonding process between cover 220 and main body 210 is prevented by the increased thickness 's' of metal layer 220b of cover 220. Therefore, the adhesion between cover 220 and main body 210 may be decreased.

Figure 7:
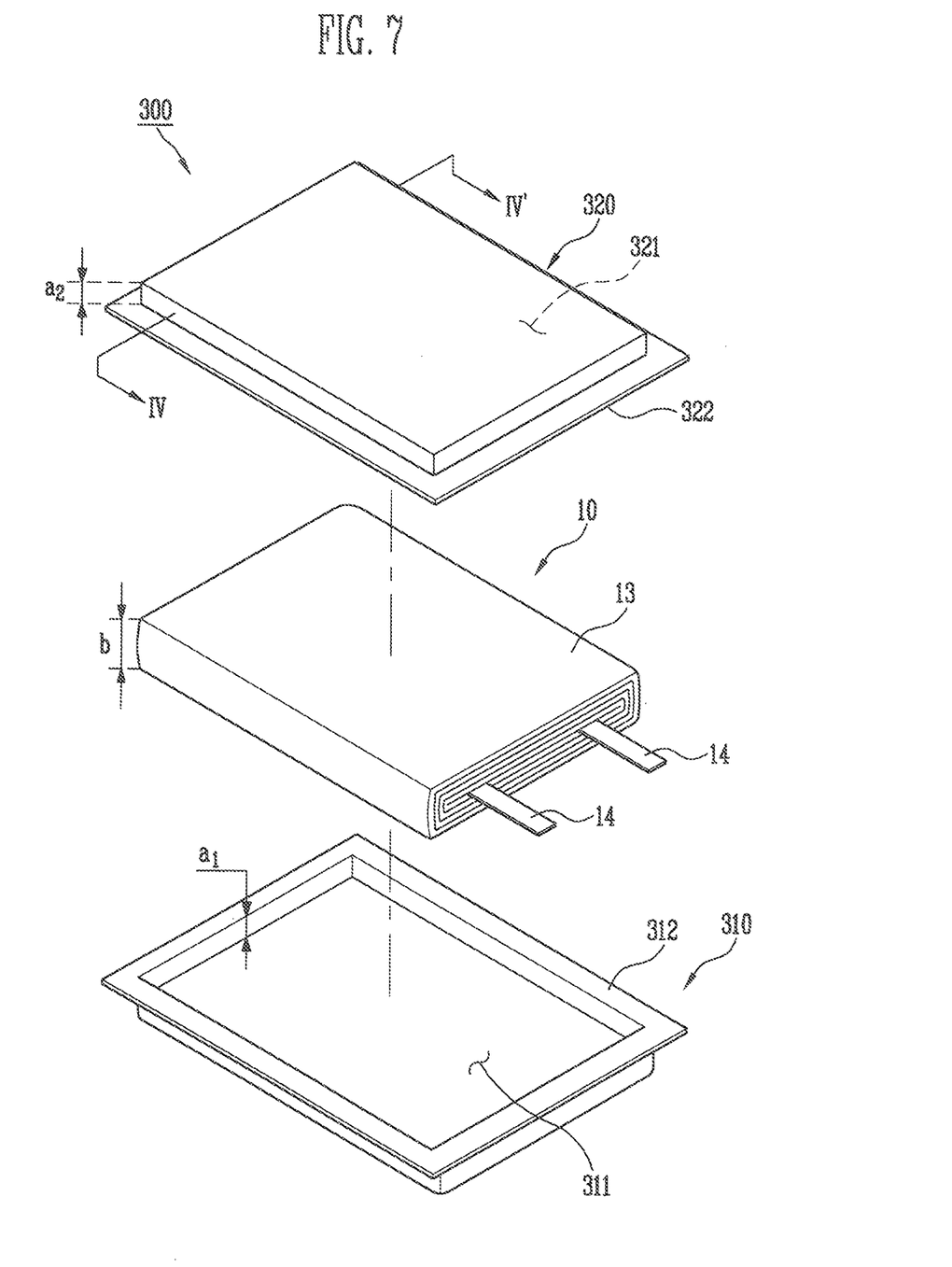
FIG. 7 is an exploded oblique view of a secondary battery constructed as still another embodiment according to the principles of the present invention.
Figure 8:
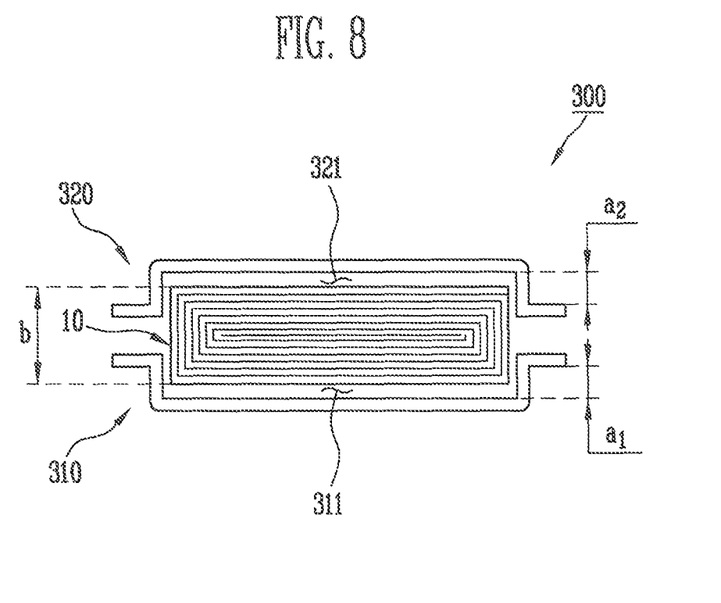
FIG. 8 is a cross-sectional view of the secondary battery constructed as the embodiment taken along sectional line IV-IV' of FIG. 7.

FIGS. 7 and 8 are views illustrating still another embodiment of the present invention.

FIG. 7 is an exploded oblique view of a secondary battery constructed as still another embodiment according to the principles of the present invention. FIG. 8 is a cross-sectional view of the secondary battery constructed as the embodiment taken along sectional line IV-IV' of FIG. 7.

Referring to FIGS. 7 and 8, secondary battery 300 constructed as this embodiment includes an electrode assembly 10 composed of a positive electrode plate, a negative electrode plate and a separator 13 interposed therebetween, and a battery case 310 and 320 provided with accommodating portions 311 and 321 that accommodate electrode assembly 10. Sum 'a1+a2' of the depths of accommodating portions 311 and 321 may be approximately 70% to approximately 80% of thickness 'b' of electrode assembly 10.

Unlike the aforementioned embodiment, battery case 310 and 320 of secondary battery 300 constructed as this embodiment may include first and second accommodating portions 311 and 321 respectively provided to first and second case portions 310 and 320 that constitute battery case 310 and 320. In this instance, sum 'a1+a2' of depth 'a1' of first accommodating portion 311 and depth 'a2' of second accommodating portion 321 is approximately 70% to approximately 80% of thickness 'b' of electrode assembly 10.

First and second accommodating portions 311 and 321 may be provided to have depths 'a1' and 'a2' identical to each other. Depths 'a1' and 'a2' of first and second accommodating portions 311 and 321 may be variously modified. In a case where depths 'a1' and 'a2' of first and second accommodating portions 311 and 321 are different in a process of manufacturing secondary battery 300, the failure rate of the process may be increased, and processing time may be lengthened. Thus, depths 'a1' and 'a2' of first and second accommodating portions 311 and 321 are identical to each other, so that the shapes of first and second case portions 310 and 320 that constitute battery case 310 and 320 correspond to each other. Accordingly, the productivity of secondary battery 300 can be increased, and the material cost of secondary battery 300 can be decreased.

Sealing portions 312 and 322 protruded to the outside of first and second case portions 310 and 320 are provided to first and second case portions 310 and 320, respectively. Sealing portions 312 and 322 are thermally bonded to seal secondary battery 300, so that it is possible to prevent leakage of electrolyte or the like.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery, comprising:
   an electrode assembly composed of a first electrode plate, a second electrode plate and a separator interposed therebetween; and
   a battery case provided with an accommodating portion that accommodates the electrode assembly,
   a depth of the accommodating portion being approximately 70% to approximately 80% of a thickness of the electrode assembly,
   the battery case maintains inwardly pressing the entire electrode assembly in out-of-plane directions with respect to a major surface of the battery case and directions perpendicular to the out-of-plane directions so that the entire electrode assembly is held in an interior of the battery case.

2. The secondary battery according to claim 1, wherein the battery case comprises a first case portion and a second case portion, and the accommodating portion is provided to at least one of the first and second case portions.

3. The secondary battery according to claim 2, wherein the first case portion is a main body to which the accommodating portion is provided, and a second case portion is a cover that covers the main body of the battery case.

4. The secondary battery according to claim 3, wherein the first and second case portions are formed of different materials.

5. The secondary battery according to claim 3, wherein each one of the first and second case portions is formed from a sheet, and the thickness of the sheet for forming the second case portion is greater than that of the first case portion.

6. The secondary battery according to claim 5, wherein each of the first and second case portions comprises an internal resin layer, a metal layer and an external resin layer, and the thickness of the metal layer of the second case portion is approximately 150% to approximately 200% of the thickness of the metal layer of the first case portion.

7. The secondary battery according to claim 6, wherein the metal layer includes aluminum.

8. The secondary battery according to claim 2, wherein first and second accommodating portions are provided to both the first and second case portions, respectively, and the sum of the depths of the first and second accommodating portions is approximately 70% to approximately 80% of the thickness of the electrode assembly.

9. The secondary battery according to claim 8, wherein the depth of the first accommodating portion is identical to that of the second accommodating portion.

10. The secondary battery according to claim 1, wherein the accommodating portion is provided to correspond to the shape of the electrode assembly.

11. The secondary battery according to claim 1, wherein the accommodating portion is provided by deep drawing.

12. The secondary battery according to claim 1, wherein the battery case is a pouch.

13. A case for a secondary battery,
    the case accommodates an electrode assembly composed of one or more electrode plates and a separator interposed between the electrode plates,
    the case comprising a first case portion and a second case portion,
    an accommodating portion being provided to at least one of the first and second case portions, and
    the depth of the accommodating portion being approximately 70% to approximately 80% of the thickness of the electrode assembly,
    the case maintaining inwardly pressure upon the entire electrode assembly in out-of-plane directions with respect to a major surface of the case and directions perpendicular to the out-of-plane directions and holding the entire electrode assembly in an interior of the battery case.

14. The case according to claim 13, wherein the first and second case portions are formed of different materials from each other, and the thickness of the second case portion is formed thicker than that of the first case portion.

15. The case according to claim 13, wherein the case is a pouch.

* * * * *